(12) United States Patent
Hakola et al.

(10) Patent No.: US 7,777,787 B2
(45) Date of Patent: Aug. 17, 2010

(54) PREVENTING FLICKER EFFECTS IN VIDEO ELECTRONIC DEVICES

(75) Inventors: Manu Hakola, Tampere (FI); Hannu Kakkori, Tampere (FI)

(73) Assignee: Nokia Corporation, Espoo (FI)

( * ) Notice: Subject to any disclaimer, the term of this patent is extended or adjusted under 35 U.S.C. 154(b) by 1243 days.

(21) Appl. No.: 11/253,288

(22) Filed: Oct. 17, 2005

(65) Prior Publication Data

US 2007/0085912 A1    Apr. 19, 2007

(51) Int. Cl.
*H04N 5/235*    (2006.01)

(52) U.S. Cl. .................. 348/226.1; 348/227.1

(58) Field of Classification Search .............. 348/226.1, 348/227.1, 228.1, 447
See application file for complete search history.

(56) References Cited

U.S. PATENT DOCUMENTS

| | | | | |
|---|---|---|---|---|
| 5,272,539 | A * | 12/1993 | Kondo ..................... | 348/229.1 |
| 5,293,238 | A * | 3/1994 | Nakano et al. ........... | 348/226.1 |
| 5,872,595 | A * | 2/1999 | Monahan ................ | 348/217.1 |
| 5,986,705 | A * | 11/1999 | Shibuya et al. ............ | 348/362 |
| 6,424,392 | B1 * | 7/2002 | Bawolek et al. ........... | 349/106 |
| 6,449,013 | B1 | 9/2002 | Suzuki et al. | |
| 6,806,471 | B2 | 10/2004 | Matsukuma et al. ... | 250/339.15 |
| 7,248,289 | B2 * | 7/2007 | Katoh et al. ............ | 348/228.1 |
| 2002/0044205 | A1 | 4/2002 | Nagoaka et al. | |
| 2004/0109069 | A1 | 6/2004 | Kaplinsky et al. | |

FOREIGN PATENT DOCUMENTS

| | | |
|---|---|---|
| EP | 0506031 | 9/1992 |
| EP | 1253780 | 10/2002 |
| EP | 1 324598 A2 | 12/2002 |
| EP | 1 329 860 A-1 | 7/2003 |
| JP | 09214827 A | 8/1997 |
| JP | 2003-270037 | 9/2003 |
| WO | WO 9956455 | 11/1999 |
| WO | WO 0007363 | 2/2000 |
| WO | WO 0124535 | 4/2001 |
| WO | WO 2004/091194 | 10/2004 |

OTHER PUBLICATIONS

Japanese Patent Office; A. Suzuki; "Notice of Reasons for Rejection"; whole document; Mar. 9, 2010; English translation only, 3 pages, Reference No. B085745.

* cited by examiner

*Primary Examiner*—Luong T Nguyen

(57) ABSTRACT

The specification and drawings present a new method, apparatus and software product for reducing flicker effects in electronic devices (e.g., a video camera, a camera-phone mobile device, a portable electronic device, etc.) by reducing an optical intensity of a video image received by the electronic device. It is determined by the electronic device whether a flicker light source is present and if predetermined conditions are met. As long as that is the case, an optical attenuation of a video image taken by the electronic device is provided using a predetermined criterion and a video signal of the video image is generated by the electronic device using an exposure time substantially equal to or a multiple of an inverse of a flicker frequency.

33 Claims, 5 Drawing Sheets

PREVENTING FLICKER EFFECTS IN VIDEO ELECTRONIC DEVICES

TECHNICAL FIELD

The present invention relates generally to video electronic devices and, more specifically, to reducing flicker noise effects in video cameras and related electronic devices.

BACKGROUND ART

Digital cameras have a certain weak point under artificial lighting conditions. Lighting which is working under AC electrical system is flickering at two times higher frequency than the electricity frequency is. There are two dominant electric frequency systems in the world: 50 Hz and 60 Hz. Electricity has both negative and positive half of a sinusoidal wave. When such electric signal is used for lighting, light automatically rectifies the signal and the output light has a frequency of 2×50 Hz=100 Hz (e.g., in Europe) or 2×60 Hz=120 Hz (e.g., in the United States). The flicker can be modelled, e.g., using functions of $\cos^2$ or $abs(\cos)$.

FIG. 1 shows frequency comparison between electricity and light: base electric frequency 'f', and light frequency '2f'. Frequency 'f' is either 50 or 60 Hz. If arbitrary exposure time is used, a digital camera image may have horizontal stripes, which are caused by light flickering. Specifically, due to 100 or 120 Hz light flickering, digital camera sensors based on a CMOS rolling shutter are showing flickering as horizontal striping on images. With sensors that have a global shutter, the flicker is apparent as the intensity of the image varies from frame to frame.

One way to avoid flicker appearance is to match an exposure time to 100 or 120 Hz frequency. In this case the exposure time can be kept at N×(1/100) second or at N×(1/120) seconds, N=1, 2, 3, etc. There are certain limitations when using this method. When the illumination level is increasing, an image brightness level can increase to such a level that the image gets saturated. Because of that at some point the exposure time will need to be shortened to less than 1/120 seconds or 1/100 seconds time where the flickering starts to appear. FIG. 2 shows the 50 Hz case, wherein the flickering is unavoidable when the exposure time is less than 1/100 seconds.

Depending on digital camera setup, a limit for a flicker appearance is achieved at a certain operational point. There are many parameters that affect a flicker sensitivity, e.g. sensor sensitivity, sensor dynamic range, gain control, lens aperture size and lens luminous intensity.

DISCLOSURE OF THE INVENTION

According to a first aspect of the invention, a method for preventing a flicker effect in an electronic device, comprises the steps of: determining whether a flicker light source is present; activating an optical intensity reducing block in the electronic device if the flicker light source is present and predetermined conditions are met; and generating a video signal of a video image using an exposure time substantially equal to or a multiple of an inverse of a flicker frequency, wherein the optical intensity reducing block, when activated, provides an optical attenuation of the video image using a predetermined criterion.

According further to the first aspect of the invention, the optical intensity reducing block may contain at least one neutral density filter. Further, the neutral density filter may provide a substantially uniform attenuation of an optical intensity by a predetermined value through a visible part of an optical spectrum.

Further according to the first aspect of the invention, the optical intensity reducing block may contain multiple neutral density filters.

Still further according to the first aspect of the invention, the optical intensity reducing block may contain at least one iris filter or a combination of at least one neutral density filter and the at least one iris filter.

According further to the first aspect of the invention, the optical intensity reducing block may contain at least one liquid crystal filter.

According still further to the first aspect of the invention, the determining whether the flicker light source is present may be performed using a test image which is substantially equivalent to the video image, and the determining may comprise the steps of: converting the test image into a test video signal by an image sensor of the electronic device; and analyzing the test video signal by a flicker analysis block of the electronic device.

According further still to the first aspect of the invention, the determining whether the flicker light source is present may be performed using frequency sampling of a test signal provided by a light sensor contained in the electronic device.

According yet further still to the first aspect of the invention, the determining whether the flicker light source is present may be performed using a secondary camera contained in the electronic device or using an additional electrical or magnetic field sensor.

Yet still further according to the first aspect of the invention, after the step of the determining whether the flicker light source is present, and if the flicker light source is present, the method may comprise the steps of: measuring a light level in the video image; and ascertaining whether the measured light level can be used with the exposure time equal to or longer than the inverse of the flicker frequency. Further, if it is ascertained that the measured light level cannot be used with the exposure time equal to or longer than the inverse of the flicker frequency, the method after the ascertaining may comprise the step of: determining whether a required exposure time is shorter than the exposure time equal to the inverse of the flicker frequency divided by a maximum optical attenuation of the optical intensity reducing block, wherein the step of the activating of the optical intensity reducing block is performed only if the required exposure time is not shorter than the exposure time equal to the inverse of the flicker frequency divided by the maximum optical attenuation of the optical intensity reducing block.

Still yet further according to the first aspect of the invention, after the generating the video signal from the video image, the optical intensity reducing block may be deactivated and may no longer provide the optical attenuation.

Still further still according to the first aspect of the invention, the electronic device may be a video camera, a digital camera, a digital video camera, a camera-phone mobile device, a wireless communication device or a portable electronic device.

According to a second aspect of the invention, a computer program product comprises: a computer readable storage structure embodying computer program code thereon for execution by a computer processor with the computer program code characterized in that it includes instructions for performing the steps of first aspect of the invention as being performed by any component of said electronic device.

According to a third aspect of the invention, an electronic device, comprises: a flicker analysis block, for determining whether a flicker light source is present and predetermined conditions are met, for providing an attenuation activating signal if the flicker light source is present and the predetermined conditions are met; an optical intensity reducing block, for providing an optical attenuation of a video image using a predetermined criterion in response to the attenuation activating signal; and an image sensor, for generating a video signal of the video image, attenuated using the predetermined criterion, using an exposure time substantially equal to or a multiple of an inverse of a flicker frequency, thus preventing a flicker effect in the electronic device.

According further to the third aspect of the invention, the optical intensity reducing block may contain at least one neutral density filter. Further, the neutral density filter may provide a substantially uniform attenuation of an optical intensity by a predetermined value through a visible part of an optical spectrum.

According further to the third aspect of the invention, the optical intensity reducing block may contain multiple neutral density filters.

Further according to the third aspect of the invention, the optical intensity reducing block may contain at least one iris filter or a combination of at least one neutral density filter and the at least one iris filter.

Still further according to the third aspect of the invention, the optical intensity reducing block may contain at least one liquid crystal filter.

According further to the third aspect of the invention, the determining whether the flicker light source is present may be performed by analyzing a test video signal by the flicker analysis block, wherein the test video signal may be provided by the image sensor converting a test image substantially equivalent to the video image into the test video signal.

According still further to the third aspect of the invention, the electronic device may further comprise: a secondary camera, for providing a test signal which is used by the flicker analysis block for the determining whether the flicker light source is present.

According yet further still to the third aspect of the invention, the electronic device may further comprise: an electrical or magnetic field sensor, for providing a test signal which is used by the flicker analysis block for the determining whether the flicker light source is present.

According further still to the third aspect of the invention, the electronic device may further comprise: a light sensor, for providing a test signal which is frequency sampled by the flicker analysis block for determining whether the flicker light source is present.

Yet still further according to the third aspect of the invention, the electronic device may further comprise: a light sensor, for measuring a light level in the video image and using the light level for ascertaining by the flicker analysis block whether the measured light level can be used with the exposure time equal to or longer than the inverse of the flicker frequency. Further, if it is ascertained that the measured light level cannot be used with the exposure time equal to or longer than the inverse of the flicker frequency, the flicker analysis block, after the ascertaining, further determines whether a required exposure time is shorter than the exposure time equal to the inverse of the flicker frequency divided by a maximum optical attenuation of the optical intensity reducing block such that the activating of the optical intensity reducing block using the attenuation actuating signal is performed only if the required exposure time is not shorter than the exposure time equal to the inverse of the flicker frequency divided by the maximum optical attenuation of the optical intensity reducing block.

Still yet further according to the third aspect of the invention, after the generating the video signal from the video image, the optical intensity reducing block may be deactivated and no longer provides the optical attenuation.

Still further still according to the third aspect of the invention, the electronic device may be a video camera, a digital camera, a digital video camera, a camera-phone mobile device, a wireless communication device or a portable electronic device.

BRIEF DESCRIPTION OF THE DRAWINGS

FIG. 3a demonstrates determining whether a flicker light source is present and FIG. 3b demonstrates generating a video signal from a video image with a neutral density filter activated, according to embodiments of the present invention.

MODES FOR CARRYING OUT THE INVENTION

Figure 1:
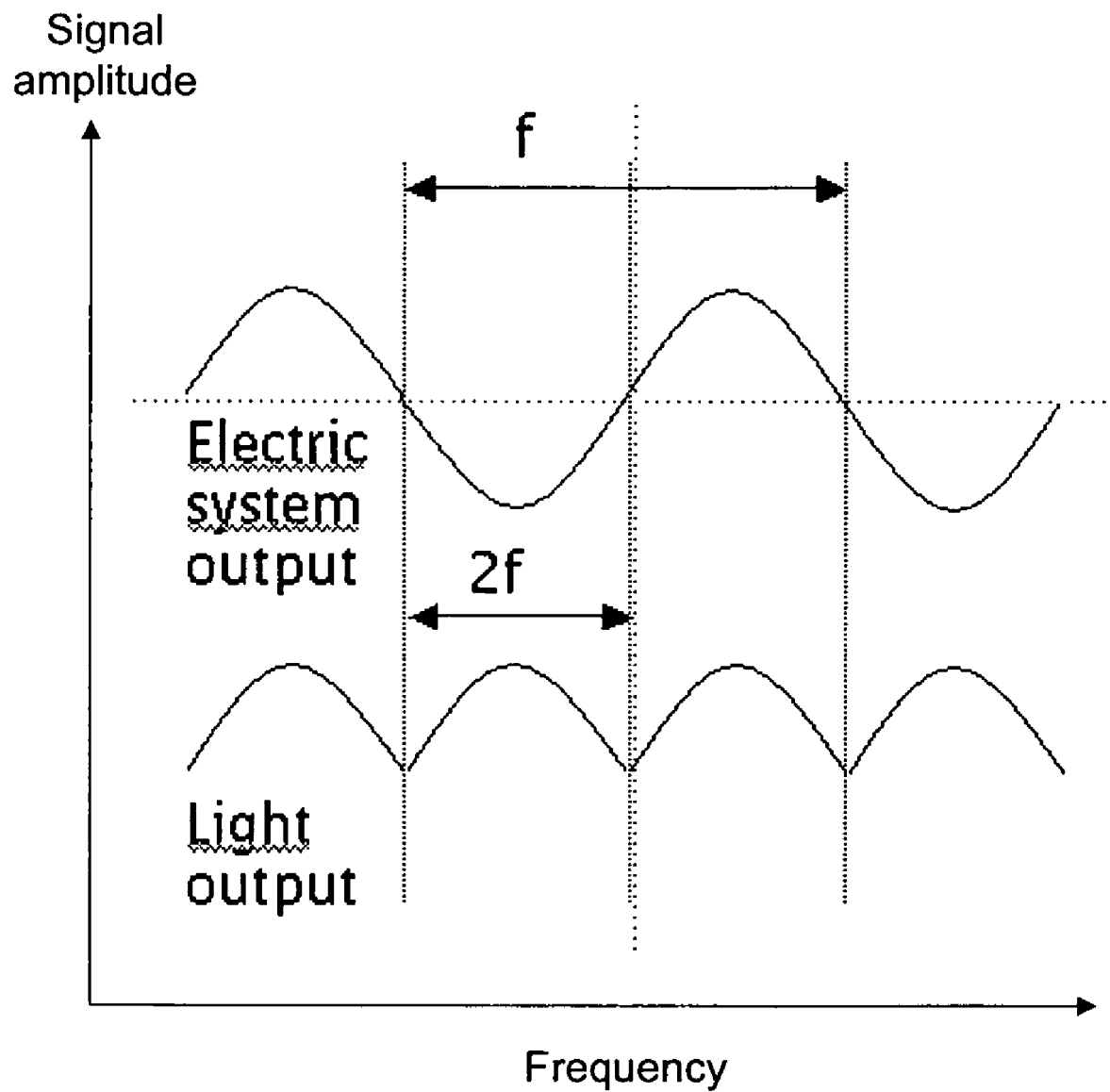
FIG. 1 is a graph showing frequency comparison between a base electric frequency f and a light frequency 2f.
Figure 2:
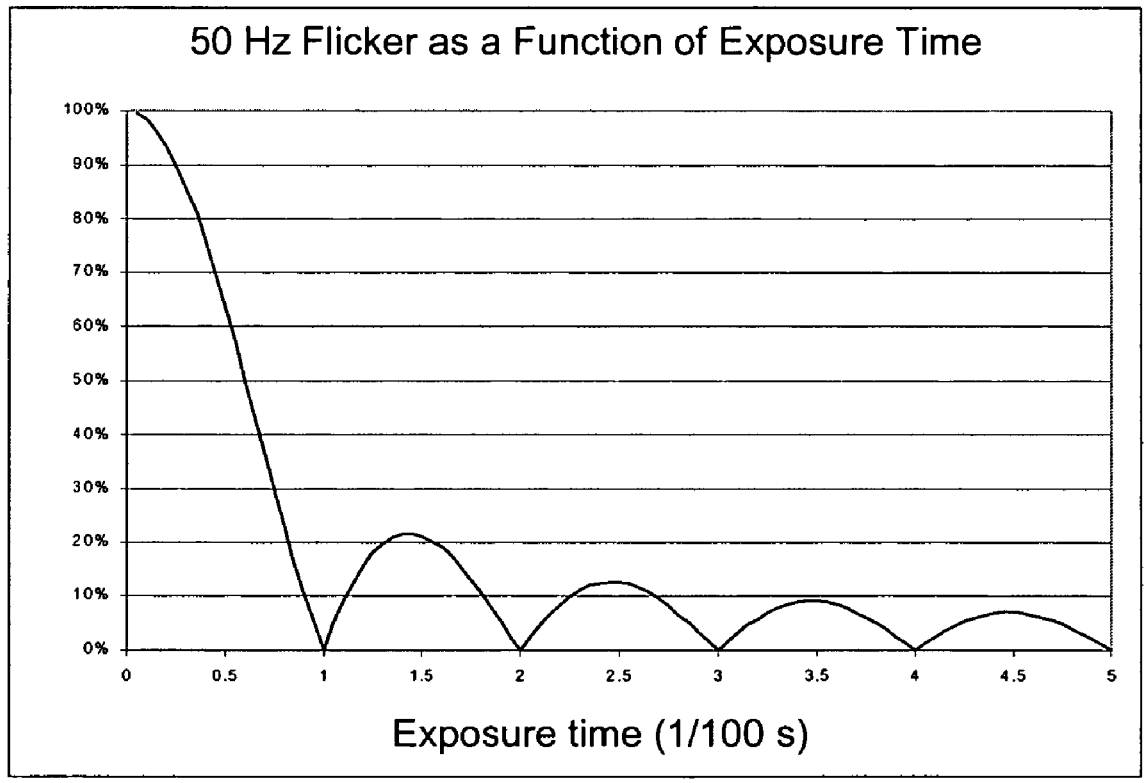
FIG. 2 is a graph showing a flicker level as a function of exposure time for f=50 Hz.

A new method, apparatus and software product are presented for reducing flicker effects in electronic devices (e.g., a video camera, a digital camera, a digital video camera, a camera-phone mobile device, a wireless communication device, a portable electronic device, etc.) by reducing an optical intensity of a video image received by the electronic device.

According to an embodiment of the present invention, it is determined by the electronic device whether a flicker light source is present and predetermined conditions (e.g., related to a light level, to a shortest exposure time, etc.), as described below in detail, are met. If the flicker light source is present and the predetermined conditions are met, then an optical attenuation of a video image taken by the electronic device is provided (e.g., by an optical intensity reducing block) using a predetermined criterion and a video signal of the video image is generated by the electronic device using an exposure time substantially equal to or a multiple of an inverse of a flicker frequency.

According to further embodiments of the present invention, the optical intensity reducing block can comprise at least one neutral density (ND) filter or multiple neutral density filters as described below in detail. The multiple ND filters can have the same attenuations or different attenuations. For the purpose of the present invention, typically the neutral density filter provides a substantially uniform attenuation of an optical intensity of a predetermined value through a visible part of an optical spectrum (the term "light" is applied to said visible part of the optical spectrum).

Moreover, according to further embodiments of the present invention, the optical intensity reducing block can comprise at least one (or multiple) iris filter or a combination of the iris filter (or multiple iris filters) with the ND filter (or ND filters). Furthermore, the optical intensity reducing block can contain at least one liquid crystal filter or other intensity reducing components involving various technologies (e.g., utilizing electro-optical, acousto-optical, magneto-optical effects, etc.). These types of filters can be permanently imbedded, e.g., in front of an image sensor, such that the optical intensity is changed by applying, e.g., an electric signal without any mechanical movement involved.

It is noted that, according to an embodiment of the present invention, if multiple optical components (e.g., multiple ND filters) with multiple optical surfaces are used, these components may have additional antireflection coatings to avoid interference effects. Furthermore, if any of the filters described above provides a known non-flat optical spectral attenuation of light, an additional electronic compensation for said non-flat optical spectral attenuation can be provided by the electronic device during electronic processing of a video signal (generated in response to the video image of interest).

Thus, according to the embodiments of the present invention described above, a user of the electronic device can use ND filtering to reduce a risk for flickering. A camera system (e.g., build-in within the electronic device) automatically detects when an automatic exposure control is going to change an exposure time to shorter than 2f (1/100 s or 1/120 s). At that point the ND filter is moved, e.g., in front of a digital camera lens block or in front of an image sensor. ND filter attenuates a video image (comprising the visible light) by a predetermined value (e.g., 50%), therefore, longer exposure times (e.g., twice of the original exposure times for the 50% attenuation) can be used without a danger of saturating images.

Figure 3A:
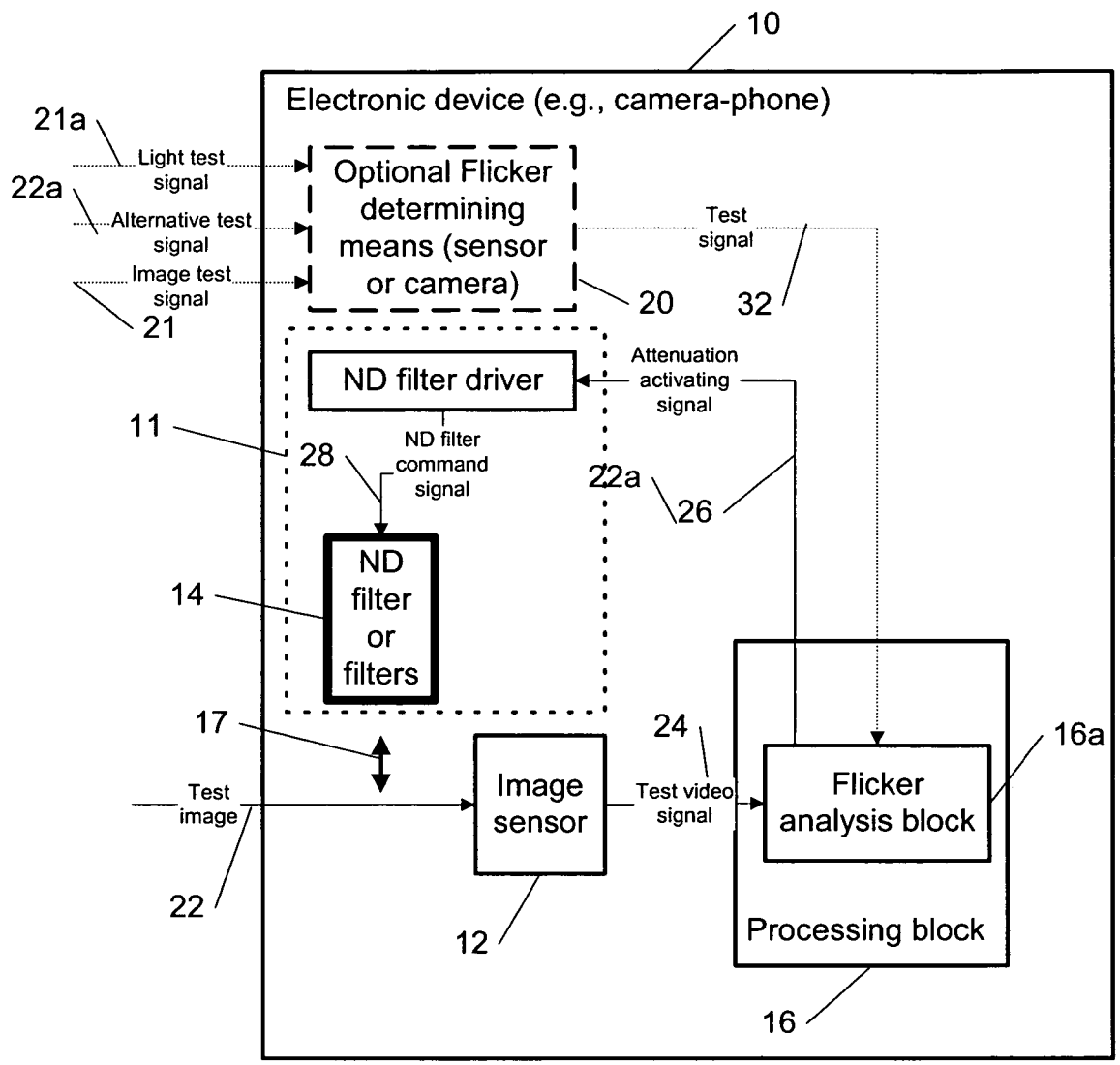
FIGS. 3a and 3b are block diagrams of an electronic device for preventing a flicker effect.
Figure 3B:
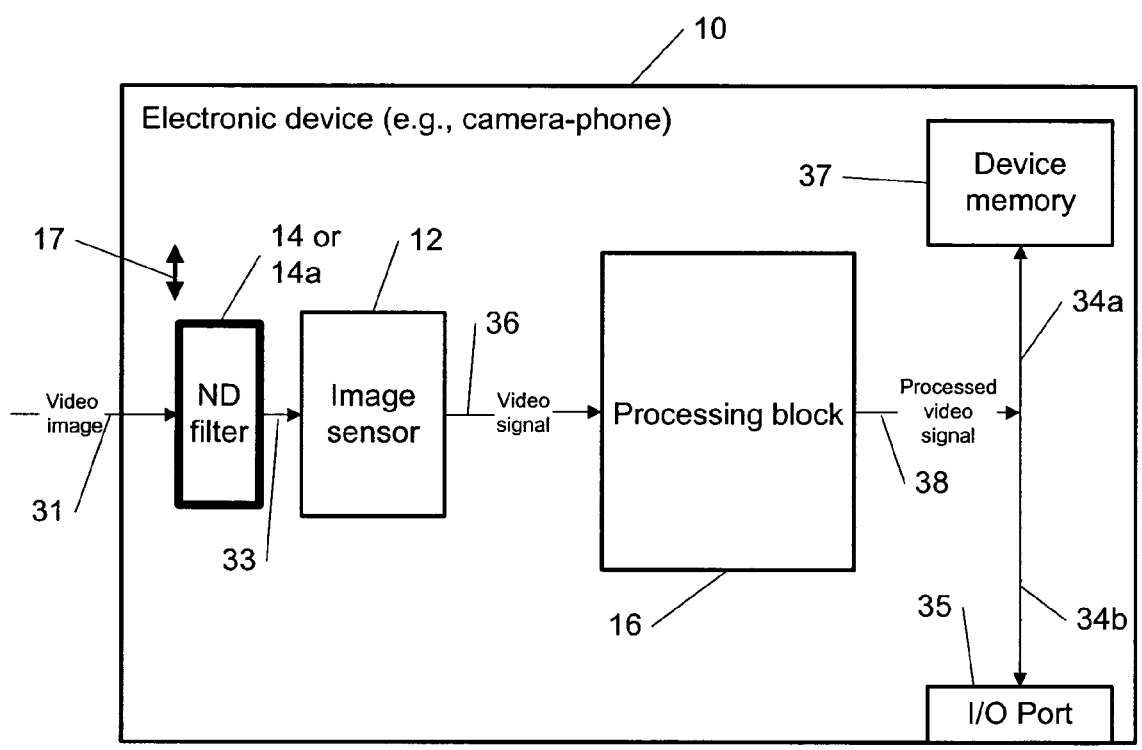

FIGS. 3a and 3b show examples among others of block diagrams of an electronic device 10 for preventing a flicker effect, according to embodiments of the present invention.

FIG. 3a demonstrates determining whether a flicker light source is present. A flicker analysis block 16a is for determining whether a flicker light source is present and whether the predetermined conditions (described below in detail) for activating an optical intensity reducing block 11 are met. The block 16a can be implemented as a part of the processing block 16 of the electronic device 10 as shown in FIG. 3a or as a separate block. The block 16a can be implemented as software, hardware or a combination thereof.

If the flicker light source is present and the predetermined conditions are met as determined by the flicker analysis block 16a, the block 16a provides an attenuation activating signal 26 to the optical intensity reducing block 11 (e.g., to a ND filter driver 18). In the example of FIG. 3a, the block 11 comprises the ND filter driver 18 and a ND filter block 14. But according to various embodiments of the present invention, as described above, the block 11 can be implemented in a variety of ways using different filter technologies.

According to embodiments of the present invention there are a plurality of ways to determine by the block 16a whether a flicker light source is present. For example, the block 16a can do it by analyzing a test video signal 24, wherein said test video signal is provided by the image sensor 12 converting a test image 22 (which is substantially equivalent to a video image to be taken by the electronic device 10) into said test video signal. Alternatively, a secondary camera 20 can be used for providing a test signal 32 (similar to the test video signal 24) in response to an image test signal 21 which is then analyzed by the block 16a for determining whether said flicker light source is present. Yet according to another embodiment, an electrical or magnetic field sensor (shown as the element 20) can be also used for providing the test signal 32 (similar to the test video signal 24) in response to an alternative test signal 22a which is then analyzed by the block 16a for determining whether said flicker light source is present. Moreover, according to a further embodiment, a light sensor (shown as element 20, which can be, e.g., an ambient light sensor typically built in camera devices) also can be used for providing the test signal 32 (similar to the test video signal 24) in response to a light test signal 21a which is then analyzed by the block 16a for determining whether said flicker light source is present.

Further, according to embodiments of the present invention, if the block 16a determines that said flicker light source is present, it will further determine whether the predetermined conditions are met before activating the optical intensity reducing block 11 using the signal 26.

For example, the block 16a can further ascertain whether the light level can be used (e.g., measured by the light sensor 20) with the exposure time equal to or longer than the inverse of the flicker frequency (e.g., this is a first predetermined condition). If the first predetermined condition for reducing optical intensity is met (i.e., the exposure time is shorter than the inverse of the flicker frequency), then the block 16a can further determine (e.g., this is a second predetermined condition) whether a required exposure time is shorter than the exposure time equal to the inverse of said flicker frequency divided by a maximum optical attenuation $A_{max}$, which can be provided by the optical intensity reducing block 11, i.e., whether the required exposure time is shorter than $A_{max}/100$ ($A_{max}/120$) seconds. The first predetermined condition for reducing optical intensity is met when the required exposure time is not shorter than $A_{max}/100$ ($A_{max}/120$) seconds. Only if both, the first and the second, predetermined conditions are met, the block 16a provides an attenuation activating signal 26 to the optical intensity reducing block 11.

FIG. 3b demonstrates generating a video signal 36 from a video image 31 with a ND filter 14a activated (the ND filter 14a can be one of multiple filters contained in the ND filter block 14), according to an embodiment of the present invention. In response to the signal 26 provided by the block 16a as described in regard to FIG. 3a, the ND filter driver 18 provides a ND filter command signal 28 (also shown in FIG. 3a) to activate an appropriate ND filter 14a (if multiple ND filters are used) and the ND filter 14a is inserted in front of the image sensor 12 by moving in a direction 17 as shown in FIG. 3b or in front of a lens block (the lens assembly is not shown in FIG. 3b). The subsequent processing by the block 16 of the video signal 36 is conventional as shown in FIG. 3b.

The maximum optical attenuation $A_{max}$ corresponds, e.g., to a ND filter contained in the ND filter block 14 with the maximum optical attenuation. However, it is not necessary to use the ND filter with the maximum optical attenuation. If multiple ND filters are used in the block 14, the signal 26 will contain an instruction on what ND filter is the most appropriate for the measured light level and depending on by how much the required exposure time is longer than $A_{max}/100$ ($A_{max}/120$) seconds (see the second predetermined condition), as analyzed by the block 16a. In other words, the block 14 can comprise ND filters of various optical densities (or optical attenuations) and the ND filter which provides the best camera operating condition without flickering is used. Also, if the block 14 uses multiple ND filter of the same or various optical densities, a number of the ND filters introduced at a time (e.g., one, two, etc.), when the block 11 is activated, can be also determined using the same methodology for providing the best camera performance without flickering.

It is noted, that according to an embodiment of the present invention, after, e.g., taking a picture (i.e., generating the video signal 36 from the video image 31), the optical intensity reducing block 11 can be deactivated (the ND filter 14a is moved out) and no longer provides the optical attenuation. Then the procedure for reducing flicker effects is repeated automatically before taking a next picture. Alternatively, the activation of the block 11 can be provided manually by a user of the electronic device 10.

Figure 4:
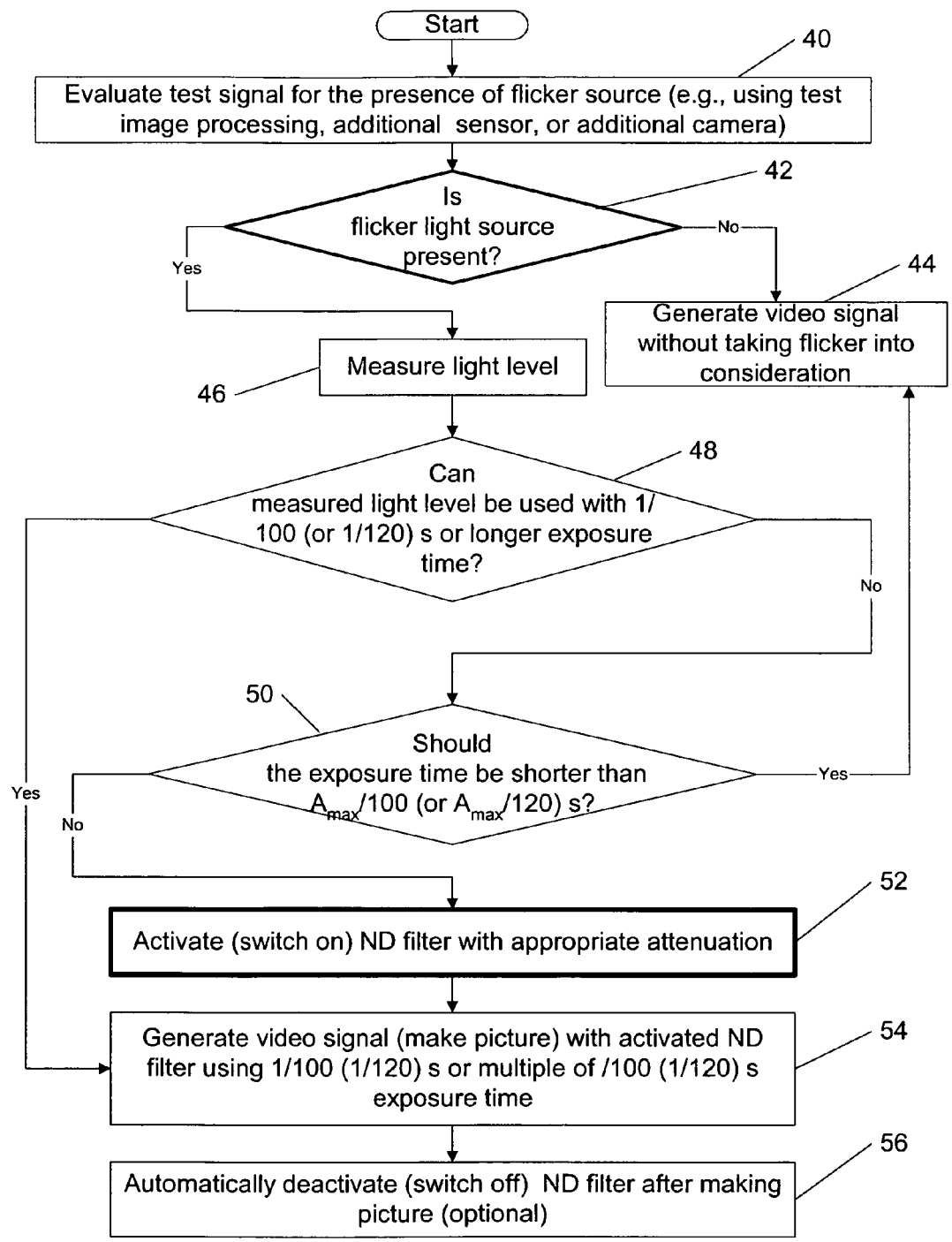
FIG. 4 is a flow chart demonstrating preventing a flicker effect in an electronic device, according to embodiments of the present invention.

FIG. 4 is a flow chart demonstrating preventing the flicker effect in an electronic device 10, according to embodiments of the present invention.

The flow chart of FIG. 4 only represents one possible scenario among others. In a method according to an embodiment of the present invention, in a first step 40, the test signal (24, 32 or 32a) is evaluated by the block 16a for the presence of the flicker light source as described above. In a next step 42, it is ascertained whether the flicker light source is present. As long as that is not the case, the process goes to step 44, wherein a video signal is generated without taking the flicker noise into consideration. If however, it is ascertained that the flicker light source is present, in a next step 46, the light level is measured.

In a next step 48, it is further ascertained whether the measured light level can be used with the ⅟₁₀₀ (or ⅟₁₂₀) seconds or longer exposure time (e.g., multiple of the inverse of the flicker frequency). As long as that is the case, the process goes to step 54, wherein a video signal is generated using ⅟₁₀₀ (⅟₁₂₀) seconds or multiple of /100 (/120) seconds exposure time. It is noted that if the optimum exposure time equals to X/100 and it is between N/100 and (N+1)/100, the image can be exposed with N/100 and an additional gain of X/N. However, if the measured light level cannot be used with the ⅟₁₀₀ (or ⅟₁₂₀) seconds or longer exposure time, in a next step 50, it is further ascertained whether the exposure time should be shorter than $A_{max}/100$ (or $A_{max}/120$) seconds ($A_{max}$ being the maximum optical attenuation which can be provided by the optical intensity reducing block 11). As long as that is the case, the process goes to step 44.

However, if it is ascertained that the exposure time should not be shorter than $A_{max}/100$ (or $A_{max}/120$) seconds, in a next step 52, the ND filter 14a (from the ND filter block 14) with an appropriate attenuation is activated introducing a desired optical attenuation of the video image using a predetermined criterion as described above.

In a next step 54, the video signal (e.g., making picture) is generated using ⅟₁₀₀ (⅟₁₂₀) seconds or multiple of /100 (/120) seconds exposure time with the activated ND filter 14a. Finally, in a step 56, the ND filter 14a is automatically deactivated (i.e., moves away) after making the picture.

As explained above, the invention provides both a method and corresponding equipment consisting of various modules providing the functionality for performing the steps of the method. The modules may be implemented as hardware, or may be implemented as software or firmware for execution by a computer processor. In particular, in the case of firmware or software, the invention can be provided as a computer program product including a computer readable storage structure embodying computer program code (i.e., the software or firmware) thereon for execution by the computer processor.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A method, comprising:
   determining whether a flicker light source is present;
   determining whether at least one predetermined exposure condition is met;
   conditionally activating an optical intensity block in an electronic device to optically attenuate a video image and provide an optically attenuated video image, where the optical intensity reducing block is activated if both the flicker light source is determined to be present and the at least one predetermined exposure condition is determined to be met and where the optical intensity reducing block is not activated if either the flicker light source is determined not to be present or the at least one predetermined exposure condition is determined not to be met; and
   generating from the optically attenuated video image, using an exposure time substantially equal to or a multiple of an inverse of a flicker frequency, a video signal of the optically attenuated video image.

2. The method of claim 1, wherein said optical intensity reducing block comprises at least one neutral density filter and wherein said at least one neutral density filter is configured to provide a substantially uniform attenuation of an optical intensity by a predetermined value through a visible part of an optical spectrum.

3. The method of claim 1, wherein said optical intensity reducing block comprises multiple neutral density filters.

4. The method of claim 1, wherein said determining whether said flicker light source is present is performed using a test image which is substantially equivalent to said video image, and said determining whether said flicker light source is present comprises:
   converting said test image into a test video signal by an image sensor of said electronic device; and
   analyzing said test video signal by a flicker analysis block of said electronic device.

5. The method of claim 1, wherein said determining whether said flicker light source is present is performed using frequency sampling of a test signal provided by a light sensor comprised in said electronic device.

6. The method of claim 1, wherein said determining whether said flicker light source is present is performed using a secondary camera comprised in said electronic device or using an additional electrical or magnetic field sensor.

7. The method of claim 1, wherein after said determining whether said flicker light source is present, and if said flicker light source is present, the method comprises:
   measuring a light level in said video image; and
   ascertaining whether said light level can be used with said exposure time equal to or longer than said inverse of said flicker frequency.

8. The method of claim 7, wherein if it is ascertained that said measured light level cannot be used with said exposure time equal to or longer than said inverse of said flicker frequency, the method after said ascertaining comprises:
   determining whether a required exposure time is shorter than said exposure time equal to said inverse of said flicker frequency divided by a maximum optical attenuation of said optical intensity reducing block,
   wherein said activating of said optical intensity reducing block is performed only if the required exposure time is not shorter than said exposure time equal to said inverse of said flicker frequency divided by said maximum optical attenuation of said optical intensity reducing block.

9. The method of claim 1, wherein, after said generating said video signal from said optically attenuated video image, said optical intensity reducing block is deactivated and configured not to provide said optical attenuation.

10. A computer program product comprising: a computer readable storage structure embodying computer program code thereon for execution by a computer processor with said computer program code, wherein said computer program code comprises instructions for performing the method of claim 1.

11. A method as claimed in claim 1, wherein the generated video signal of the attenuated video image provides a generated video image having, compared to the video image, a substantially uniform attenuation through a visible part of the spectrum.

12. A method as claimed in claim 1, wherein said optical intensity reducing block, when activated, provides the optical attenuation of said video image using a predetermined criterion.

13. A method as claimed in claim 1, wherein the at least one predetermined exposure condition is dependent upon an extent of an attenuation.

14. A method as claimed in claim 1, further comprising determining whether using the exposure time substantially equal to an inverse of the flicker frequency would result in over-exposure of the video image without an attenuation and satisfactory exposure of the video image with the attenuation.

15. A method as claimed in claim 1, further comprising selecting an attenuation that would result in satisfactory exposure of the video image when using the exposure time substantially equal to or a multiple of the inverse of the flicker frequency.

16. A method as claimed in claim 1, further comprising, if the flicker light source is determined to be present and the at least one predetermined exposure condition is determined not to be met, generating from a non-attenuated video image, using the exposure time substantially equal to or a multiple of the inverse of the flicker frequency, a video signal of the video image.

17. A method as claimed in claim 1, further comprising, if the flicker light source is determined not to be present, generating from a non-attenuated video image, using an unconstrained exposure time not constrained to be substantially equal to or a multiple of the inverse of the flicker frequency, a video signal of the video image.

18. An electronic device, comprising:
    a flicker analysis block, configured to determine whether a flicker light source is present and at least one predetermined exposure condition is met, and configured to provide an attenuation activating signal if both the flicker light source is determined to be present and the at least one predetermined condition is determined to be met but not if either the flicker light source is determined not to be present or the at least one predetermined exposure condition is determined not to be met;
    an optical intensity block, configured to optically attenuate a video image, in response to said attenuation activating signal, and to provide an optically attenuated video image; and
    an image generator, comprising an image sensor, configured to generate from the optically attenuated video image, using an exposure time substantially equal to or a multiple of an inverse of a flicker frequency, a video signal of said optically attenuated video image.

19. The electronic device of claim 18, wherein said electronic device is a video camera, a digital camera, a digital video camera, a camera-phone mobile device, a wireless communication device or a portable electronic device.

20. The electronic device of claim 18, wherein said optical intensity reducing block comprises at least one neutral density filter.

21. The electronic device of claim 20, wherein said at least one neutral density filter is configured to provide a substantially uniform attenuation of an optical intensity by a predetermined value through a visible part of an optical spectrum.

22. The electronic device of claim 18, wherein said optical intensity reducing block comprises multiple neutral density filters.

23. The electronic device of claim 18, wherein said optical intensity reducing block comprises at least one iris filter or a combination of at least one neutral density filter and said at least one iris filter.

24. The electronic device of claim 18, wherein said optical intensity reducing block comprises at least one liquid crystal filter.

25. The electronic device of claim 18, wherein said flicker analysis block is configured to determine whether said flicker light source is present by analyzing a test video signal, wherein said test video signal is provided by the image sensor converting a test image substantially equivalent to said video image into said test video signal.

26. The electronic device of claim 18, wherein said electronic device further comprises:
    a secondary camera, configured to provide a test signal to said flicker analysis block for said determining whether said flicker light source is present.

27. The electronic device of claim 18, wherein said electronic device further comprises:
    an electrical or magnetic field sensor, for configured to provide a test signal to said flicker analysis block for said determining whether said flicker light source is present.

28. The electronic device of claim 18, wherein said electronic device further comprises:
    a light sensor, configured to provide a test signal which is frequency sampled by said flicker analysis block for determining whether said flicker light source is present.

29. The electronic device of claim 18, wherein said electronic device further comprises:
    a light sensor, configured to measure a light level in a test image or signal, wherein said flicker analysis block is configured to ascertain whether said light level can be used with said exposure time equal to or longer than said inverse of said flicker frequency.

30. The electronic device of claim 29, wherein if it is ascertained that said measured light level cannot be used with said exposure time equal to or longer than said inverse of said flicker frequency, the flicker analysis block, after said ascertaining, is further configured to determine whether a required exposure time is shorter than said exposure time equal to said inverse of said flicker frequency divided by a maximum optical attenuation of said optical intensity reducing block such that said activating of said optical intensity reducing block using said attenuation actuating signal is performed only if the required exposure time is not shorter than said exposure time equal to said inverse of said flicker frequency divided by said maximum optical attenuation of said optical intensity reducing block.

31. The electronic device of claim 18, wherein, after said generating said video signal from said optically attenuated video image, said optical intensity reducing block is deactivated and configured not to provide said optical attenuation.

32. An electronic device, comprising:
    means for determining whether a flicker light source is present and at least one predetermined exposure condition is met, and for providing an attenuation activating signal if both the flicker light source is determined to be present and the at least one predetermined condition is determined to be met but not if either the flicker light source is determined not to be present or the at least one predetermined exposure condition is determined not to be met;

means for optically attenuating a video image, in response to said attenuation activating signal, for providing an optically attenuated video image; and means for generating from the optically attenuated video image, using an exposure time substantially equal to or a multiple of an inverse of a flicker frequency, a video signal of said optically attenuated video image.

33. The electronic device of claim 32, wherein said means for generating the video signal is an image sensor.

* * * * *